(12) United States Patent
Seeg

(10) Patent No.: US 7,900,987 B2
(45) Date of Patent: Mar. 8, 2011

(54) COVERING SYSTEM FOR A REAR STORAGE SPACE OF A VEHICLE

(75) Inventor: Thomas Seeg, Ostfildern (DE)

(73) Assignee: Bos GmbH & Co. KG, Ostfildern (DE)

( * ) Notice: Subject to any disclaimer, the term of this patent is extended or adjusted under 35 U.S.C. 154(b) by 259 days.

(21) Appl. No.: 12/150,996

(22) Filed: May 2, 2008

(65) Prior Publication Data

US 2008/0272620 A1 Nov. 6, 2008

(30) Foreign Application Priority Data

May 3, 2007 (DE) .......................... 10 2007 021 428

(51) Int. Cl.
*B60R 5/04* (2006.01)
(52) U.S. Cl. ...................................................... 296/24.4
(58) Field of Classification Search ................. 296/24.4, 296/24.43, 98; 280/749; 160/238, 265, 266, 160/267.1, 270, 290.1, DIG. 2
See application file for complete search history.

(56) References Cited

U.S. PATENT DOCUMENTS

| | | | |
|---|---|---|---|
| 6,402,217 B1 * | 6/2002 | Ament et al. | 296/37.16 |
| 6,416,103 B1 * | 7/2002 | Laudenbach et al. | 296/37.1 |
| 6,966,591 B2 * | 11/2005 | Schlecht | 296/37.16 |
| 7,021,692 B2 * | 4/2006 | Laudenbach et al. | 296/76 |
| 2004/0000797 A1 * | 1/2004 | Laudenbach et al. | 296/24.1 |
| 2005/0012352 A1 * | 1/2005 | Sparrer et al. | 296/24.43 |
| 2005/0082859 A1 * | 4/2005 | Walter et al. | 296/24.4 |
| 2005/0179275 A1 * | 8/2005 | Zaiser et al. | 296/24.3 |
| 2007/0096487 A1 | 5/2007 | Woerner | |

FOREIGN PATENT DOCUMENTS

| | | |
|---|---|---|
| DE | 103 01 166 A1 | 8/2004 |
| DE | 10 2005 049 999 A1 | 4/2007 |
| EP | 1 775 165 A1 | 4/2007 |

OTHER PUBLICATIONS

European Patent Office Search Report dated Dec. 12, 2008 (9 pages).
Office Action of the Germany Patent Office dated Dec. 12, 2007 (4 pages).

* cited by examiner

*Primary Examiner* — H Gutman
(74) *Attorney, Agent, or Firm* — Flynn, Thiel, Boutell & Tanis, P.C.

(57) ABSTRACT

A covering system for a rear storage space of a vehicle, with two guide rails running parallel and arranged on both sides of the rear storage space, includes a largely dimensionally stable closing surface element which has guide devices on both sides. The guide devices are arranged movably within the guide rails and make it possible for the largely dimensionally stable closing surface element to be movable along the guide rails between a lower and an upper end position.
At least one pivoting section of the closing surface element is designed such that it can be pivoted downward at least in the upper end position.

11 Claims, 6 Drawing Sheets

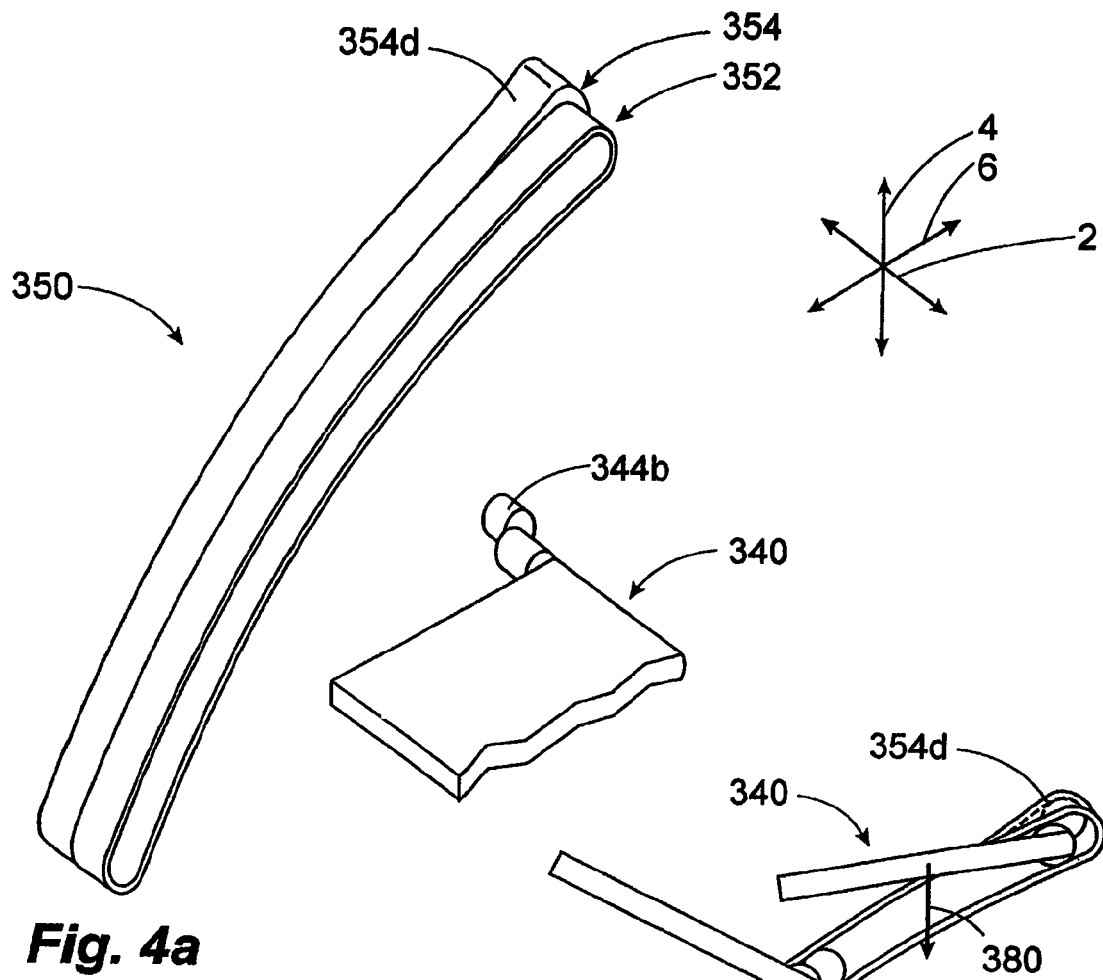

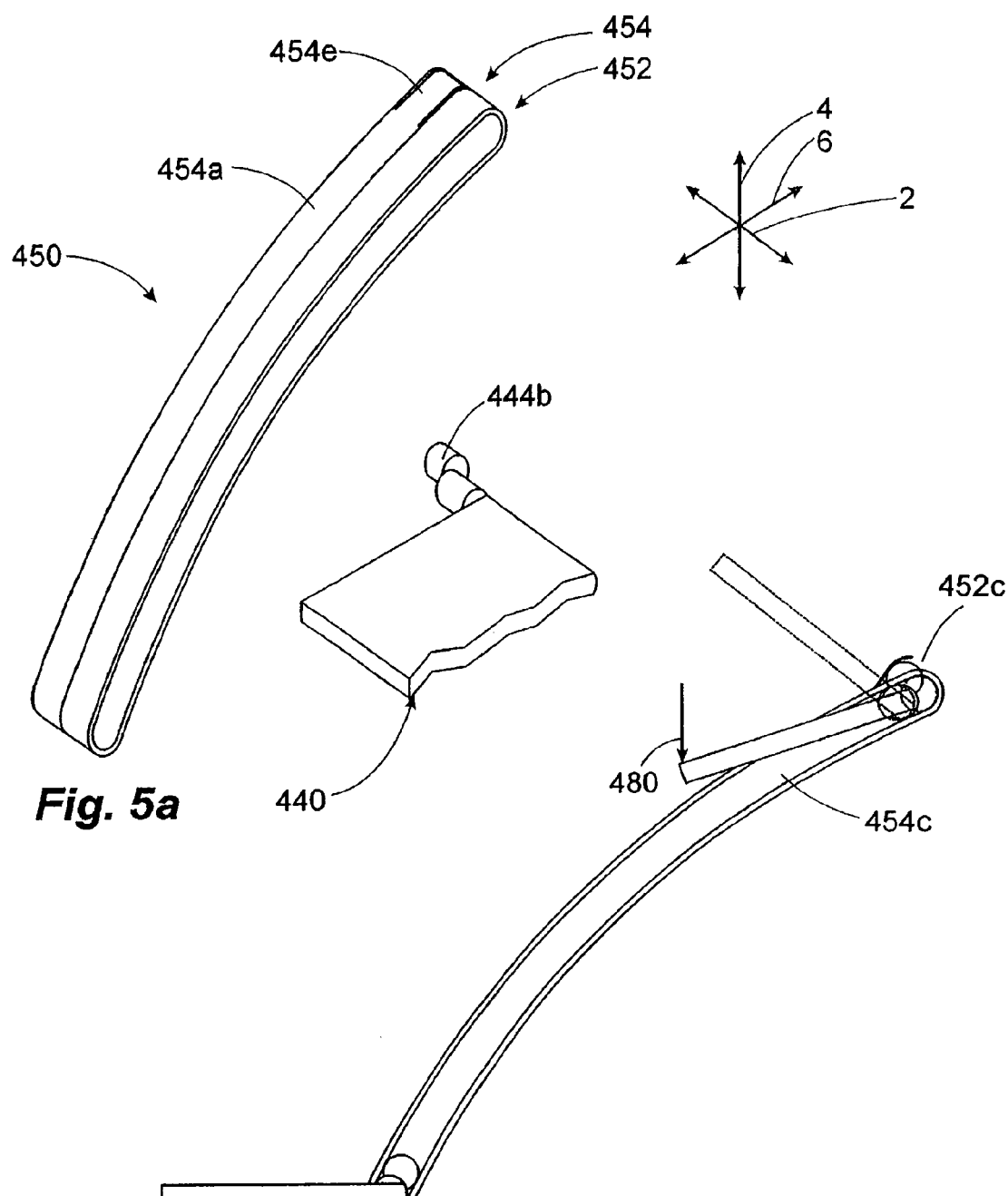

COVERING SYSTEM FOR A REAR STORAGE SPACE OF A VEHICLE

FIELD OF INVENTION

The invention relates to a covering system for a rear storage space of a vehicle, with two guide rails which run essentially parallel and can be arranged on both sides of the rear storage space in a manner spaced apart from each other in the transverse direction of the vehicle, and a largely dimensionally stable closing surface element which has guide devices on both sides, wherein the guide devices are arranged movably within the guide rails and make it possible for the largely dimensionally stable closing surface element to be movable along the guide rails between a lower and an upper end position.

BACKGROUND OF THE INVENTION

Covering systems of the type in question are used in vehicles in order to close at least some sections of a rear storage space. This serves to protect against prying eyes, since the covering system prevents items of luggage and the like in the rear storage space from being able to be seen from the outside. Covering systems of the type in question usually have a flexible sheetlike structure which can generally be extended from a roller blind shaft and, in an extended functional position, covers most of the rear storage space. In the case of covering systems of the type in question, this flexible sheetlike structure is adjoined on the rear side by the largely dimensionally stable closing surface element which is usually designed as a contour part and is adapted to the contour of the rear storage space in the region of a loading flap. Said dimensionally stable closing surface element can be displaced vertically via guide rails which are provided on both sides in the side walls of the vehicle. This permits the covering system to be left in an extended functional state and nevertheless for unproblematic access to the luggage under the largely dimensionally stable closing surface element and the flexible sheetlike structure to be obtained. For this purpose, the largely dimensionally stable closing surface element is displaced upward by means of the guide devices, which are arranged in the guide rails, into the region of a vehicle roof lining.

The fact that, in this upper end position and with a corresponding rail profile, the closing surface element projects out of the rear storage space is considered a problem. When the loading flap is being closed, the closing surface element and the loading flap may therefore collide, which can lead to damage to the closing surface element and/or to the loading flap. This is particularly critical with regard to covering systems in which the vertical movability of the dimensionally stable closing surface element takes place in an automated manner, with the closing surface element automatically moving upward when the loading flap is opened. Such a system, which is not conceived for manual handling for the raising and lowering of the closing surface element, requires a specific initiation of the operation to lower the largely dimensionally stable closing surface element in order to be able only subsequently to close the loading flap.

It is therefore the object of the invention to develop a covering system of the type in question to the effect that the risk of damage to the largely dimensionally stable closing surface element during the closing of the loading flap is avoided.

According to the invention, this is achieved by a covering system of the type in question which is developed to the effect that at least one pivoting section of the closing surface element is designed such that it can be pivoted downward at least in the upper end position.

Pivotability downward is understood within the context of this invention as meaning that, when the closing surface element is in its upper end position, the pivoting section points further downward than in the state in which the closing surface element is in its lower end position. The effect achieved by the pivoting of the pivoting section downward is that a loading flap can be closed without damage to the pivoting section being caused in the process. It is particularly preferred if the pivoting section is formed by the entire closing surface element. In such a case, the closing surface element can be a fully dimensionally stable design. In the case of an embodiment with a separate pivoting section, the latter is of dimensionally stable design and can be pivoted in relation to a second section of the closing surface element. In this case, the pivoting section preferably takes up the predominant part of the closing surface element.

The covering system can be configured in such a manner that, in the upper end position, the pivoting section is pivoted downward without application of force by means of the dead weight of the pivoting section. In such a configuration, the pivoting section is pivoted downward as it were automatically in the upper end position of the closing surface element. As a result, during the closing of a loading flap, a damaging collision between the loading flap and the pivoting section does not occur. This configuration can be realized by the fact that the guide rails and the guide devices on the closing surface element side are designed in such a manner that they cause pivoting in the region of the upper end position in the manner of a forced guidance means.

In an alternative configuration, in the upper end position, the pivoting section can be pivoted downward by an application of force with a pivoting force which goes beyond the dead weight of the pivoting section and acts in the vertical direction of the vehicle. In such a configuration, if a pivoting force is absent the pivoting section is in the unpivoted state such that it may project through the open loading hatch. Only by application of force with the pivoting force is it folded away downward. This application of force takes place in the fitted situation in particular by means of the loading flap itself which, over the course of the closing operation, comes into touching contact with the pivoting section and, in the process, pivots it downward.

In the case of a configuration building thereon, in the upper end position, the pivoting section can be pivoted elastically such that the pivoting is maintained only for the duration of the application of force. This constitutes a particularly simple way of making it pivotable, since only elastic deflection means have to be provided in order to ensure the pivotability of the pivoting section. As soon as the pivoting force ceases, for example when the loading flap is opened or when the dimensionally stable closing surface element is lowered, the pivoting section passes back into its unpivoted state.

In a development of the invention, the pivoting section is pivoted or can be pivoted only in the upper end position. In this case, it is preferred if the pivoting section is oriented horizontally outside the upper end position. This permits the pivoting section to be used as a storage surface until it is transferred into the upper end position.

In a development of the invention, elastically deformable connecting means are provided between the pivoting section of the closing surface element and a non-pivotable section of the closing surface element. These elastically deformable connecting means ensure the pivotability and are simple to realize. In the simplest case, it involves one or more connecting webs made of an elastically deformable material, such as, for example, rubber. A connection between the pivoting section and the non-pivotable section via a hinge arrangement may likewise be expedient, with a spring element which keeps the pivoting section in its unpivoted position outside the upper end position additionally being provided. In the upper end position, said spring element is elastically deformed in the manner prescribed when a pivoting force is present, in order to permit pivoting of the pivoting section.

In a development of the invention, the guide rails and the guide device are co-ordinated with each other in such a manner that the closing surface element is pivoted in the upper end position. Accordingly, in the case of this configuration, the effect achieved by the shaping of the guide means in the region of the upper end position is that, in the upper end position, the closing surface element always automatically takes up the pivoted position irrespective of the opening state of the loading flap. Conceivable configurations provide that, for example by means of a spacing apart of the guide rails from each other in the transverse direction of the vehicle, which spacing apart changes in the direction of the upper end position, the guide devices are pressed toward each other during a movement in the direction of the upper end position and, according to the invention, influence the pivoting means of the closing surface element via a slotted guide mechanism. As an alternative, guide rails which become wider in the region of the upper end position can be provided, and therefore the guide devices, which are compulsorily guided with regard to their orientation by the guide rails in the region of the lower end position, can be rotated to a limited extent in said upper region such that the closing surface element is shifted in a pivoted position because of its weight. The use of guide rails with two guide tracks in each case may likewise be expedient, with each guide device engaging in the guide rails by means of in each case two sliding blocks such that the angular position of the entire dimensionally stable closing surface element can be influenced in a specific manner for each position of the dimensionally stable closing surface element by means of the position of the sliding blocks relative to each other.

In a development of the invention, the guide rails and/or guide devices can be deformed elastically in some sections in such a manner that the closing surface element can be pivoted in the upper end position. In the case of this configuration, sections are preferably provided in the guide rails, which sections, when a pivoting force acting on the closing surface element is not present, keep the guide devices in a first position and said sections, when a pivoting force is present, are deflected by the guide devices and, as a result, permit a pivoting movement of the guide devices, resulting in a pivoting of the closing surface element.

This can be configured in particular in such a manner that the guide rails have, at least in a region in which the guide devices are located when the closing surface element is in its upper end position, elastically deflectable sections, preferably spring tabs connected integrally to the guide rails.

The invention furthermore relates to a guide rail in a covering system in a vehicle, in particular for use in a covering system according to one of the preceding claims, with a first guide track for receiving a first guide body which is movable in the first guide track. According to the invention, a second guide track for receiving a second guide body which is movable in the second guide track is provided on said guide rail of the type in question, with the second guide track being offset in relation to the first guide track in an offset direction transversely with respect to the guide tracks, and the first guide track and the second guide track having a different profile, at least in some sections, with reference to a plane extending perpendicularly to the offset direction.

By means of such a design with two guide tracks in which a respective guide body engages, a defined guidance characteristic of a component guided by the guide bodies, in particular the dimensionally stable surface part, is ensured. The guide rail is decisive not only for the position of the guide bodies but also for the orientation of a component connected to the two guide bodies, since the path of the guide bodies in the guide rail can be defined in a specific manner separately by means of the different guide tracks. The guide tracks extend in mutually parallel planes, preferably in different planes. The offset direction which is essentially perpendicular to said planes preferably corresponds to a transverse direction of the vehicle.

The guide tracks are preferably directly adjacent to each other in the offset direction. As a result, the guide bodies can also merge directly one into the other such that the second guide body directly adjoins the first one. It is particularly preferred if the guide tracks are delimited by a common, integral guide rail component. This leads to a very simple assembly and to avoiding undesirable positional deviations between the two guide tracks.

In a development of the guide rails according to the invention, the latter run parallel to each other over their entire length. The effect achieved in the case of a configuration of this type is that the guide bodies must also always take up the same position relative to each other irrespective of their position in the guide tracks. This permits a component which is movable along the guide rail and always has the same orientation, in particular a horizontal orientation, irrespective of its position to be provided on the guide bodies. When a guide rail according to the invention is used in a covering system according to the invention, such a design with parallel guide tracks would be expedient in particular in conjunction with a largely dimensionally stable closing surface element which has a non-pivotable pivoting section and a pivoting section which is pivotable relative thereto.

In another refinement, one of the guide tracks is delimited by an elastically deflectable section which is arranged in such a manner that it can be deflected by the associated guide body. In this design, the profile of the guide tracks accordingly differs at least in that one of the guide tracks has, at least in the state with the deflected section, a profile which differs from the other guide track. The elastic design here ensures that the deflectable section takes up its deflected position only in the event of the occurrence of external forces which act on the guide bodies. This permits, for example, a yielding of a component connected to the guide bodies, in particular the dimensionally stable closing element, in order to avoid damage.

In one development of the invention, one guide track has a widened section, preferably at one end of the guide track. As soon as the associated guide body is located in said widened section, it has play to a limited extent, thus permitting pivoting of the component connected to the guide bodies about an axis defined by the other guide body. In this case, depending on the configuration of the component connected to the guide bodies, automatic pivoting also occurs under the influence of the weight of the component.

Furthermore, a guide rail of the type in question can also be designed in such a manner that the guide rail has an elastically deflectable section which is arranged in such a manner that, in the region of the deflectable section, the first guide body is rotatable about an axis of rotation, which runs perpendicularly to a direction of extent of the first guide track, counter to a spring force.

Furthermore, the invention relates to a vehicle with a rear storage space, wherein a covering system which is designed in the above described manner is provided in the rear storage space. In a particular configuration, the covering system is arranged in such a manner that, in its upper end position, the dimensionally stable closing surface element is in touching contact with a loading flap of the vehicle.

BRIEF DESCRIPTION OF THE DRAWINGS

Further advantages and features of the invention emerge from the claims and the description below of preferred exemplary embodiments of the invention, which are illustrated with reference to the drawings, in which:

FIGS. 4a and 4b show a fourth embodiment of a covering system according to the invention, FIGS. 5a and 5b show a fifth embodiment of a covering system according to the invention.

DETAILED DESCRIPTION

Figure 1:
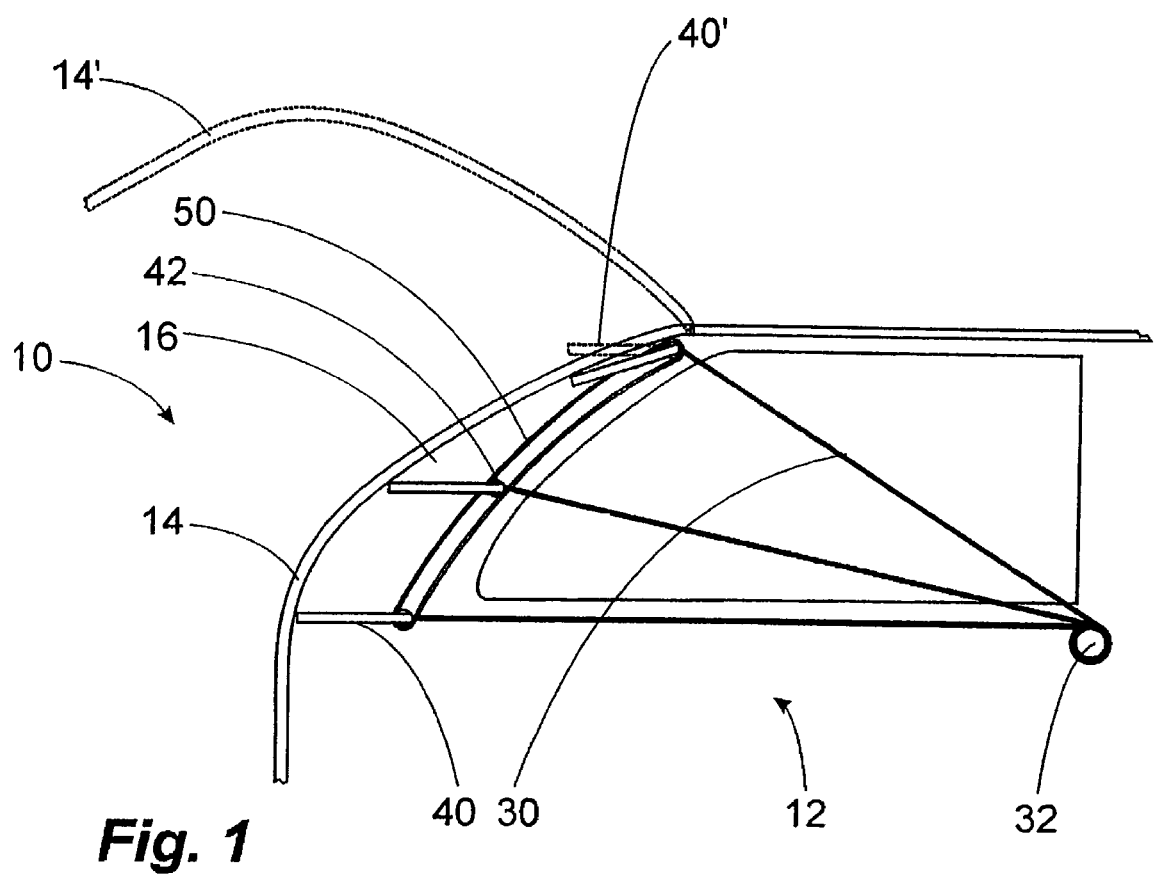
FIG. 1 shows the rear region of a vehicle with a covering system according to the invention.

FIG. 1 shows the rear region 10 of a motor vehicle in a schematic side view. A rear storage space 12 of the vehicle is accessible via a loading flap 14. The open state 14' of the loading flap 14 is illustrated by dashed lines. A covering system which is illustrated in various states is provided in the rear storage space 12. For the purpose of protection against prying eyes, said covering system has a flexible sheetlike structure 30 which can be unrolled from a roller blind shaft 32, and a dimensionally stable closing surface element 40 which, at the rear end, adjoins the flexible sheetlike structure 30. The dimensionally stable closing surface element 40 is provided on both sides in the transverse direction of the vehicle with integrally formed guide devices 42 which engage in two guide rails 50 likewise arranged on both sides of the loading space. The configuration of the guide devices 42 and of the guide rails 50 is not illustrated in FIG. 1 for reasons concerned with clarity. Their specific configuration can correspond to one of the embodiments of the figures below.

The dimensionally stable closing surface element 40 is movable along a D pillar 16 of the vehicle via the guide devices 42. In the process, a mechanism (not illustrated specifically) ensures that the closing surface element 40 is always held approximately horizontally irrespective of its position. The closing surface element 40 can thus be displaced between a lower end position, in which it forms a largely uniform, horizontal surface together with the flexible closing surface element 30, and an upper end position in which the closing surface element 40 is arranged in the vicinity of the roof lining.

While the closing surface element 40 can be oriented horizontally in its lower end position and in an intermediate position, which is provided on the way to the upper end position, without colliding with the loading flap 14, the dimensionally stable closing surface element 40, in its upper end position, projects out of the loading hatch of the vehicle, as the dashed illustration 40' clarifies. In order not to risk any damage over the course of the closing of the loading flap 14, the dimensionally stable closing surface element can be deflected elastically. When the loading flap 14 is closed, the closing surface element 40 is therefore deflected downward and takes up the position illustrated.

The design illustrated makes it possible to provide the covering system comparatively far to the rear in the vehicle and not to have to take special measures in order to avoid damaging the closing surface element 40. The latter is automatically pivoted when closing the loading flap 14. This is particularly advantageous in the case of electrically driven systems which move upward and downward in an automated manner as a function of the opening state of the loading flap 14.

Figure 2A:
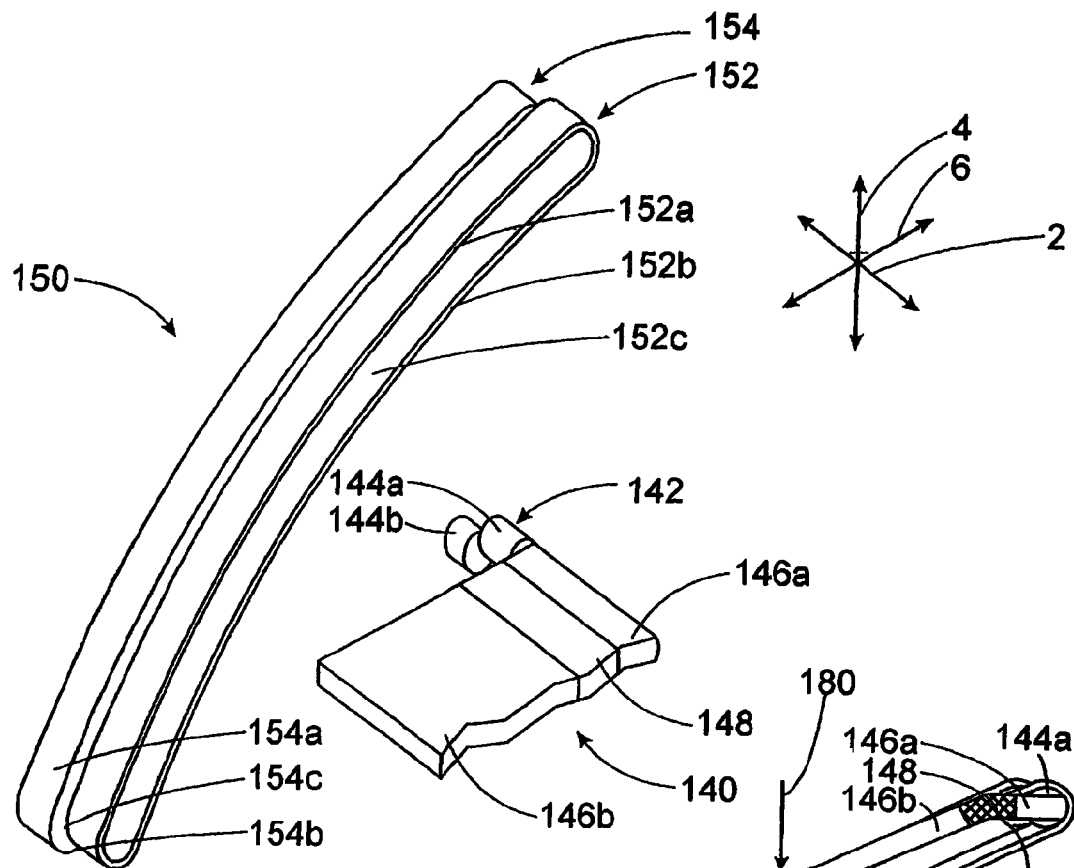
FIGS. 2a and 2b show a second configuration of a covering system according to the invention.
Figure 2B:
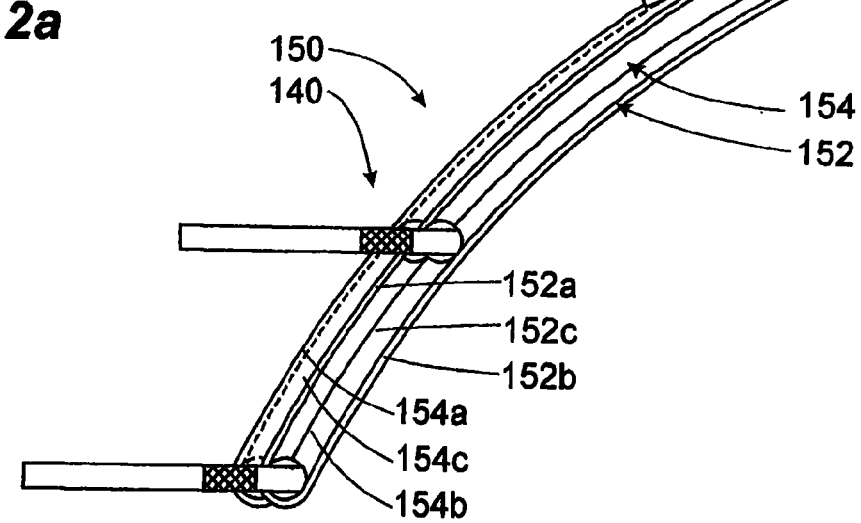

FIGS. 2a and 2b show a second embodiment of a covering system according to the invention in a more detailed view. In this case, as in the embodiments below of covering systems according to the invention, only one side of the symmetrically constructed covering system is illustrated in each case.

This second embodiment of a covering system according to the invention has a guide rail 150 which is provided for arrangement in particular in a D pillar of a vehicle. The guide rail 150 has an inner guide rail section 152 and an outer guide rail section 154, with reference to the rear storage space. The two guide rail sections 152, 154 are part of an integral component and are directly adjacent to each other. The inner guide rail section 152 has an upper and a lower guide wall 152a, 152b. The two guide walls delimit the guide track 152c located in between them. The first guide rail section 152 does not have a rear wall. Instead, it is directly adjoined by the second guide rail section 154 which likewise has two guide walls 154a, 154b which define a guide track 154c. The two guide tracks 152c, 154c have an identical shaping, but are displaced parallel in relation to each other in a plane defined by the vertical direction 4 of the vehicle and the longitudinal direction 6 of the vehicle.

A closing surface element 140 which extends over the width of the rear storage space is inserted into the guide rail 150. On both sides, guide devices 142 are provided on the closing surface element. Each guide device 142 comprises two guide bodies 144a, 144b which are connected rigidly to each other and to the closing surface element 140. Said guide bodies are provided for reception in the guide tracks 152c, 154c in which they are respectively guided by the guide walls 152a, 152b, 154a, 154b. In this case, the outer, second guide body 144b is arranged offset in relation to the inner guide body 144a, with the offset being identical to the parallel offset of the first guide rail section 152 in relation to the second guide rail section 154. The closing surface element 140 itself has a section 146a which is connected rigidly to the guide devices 142, an elastic connecting section 148 joining said section and a pivoting section 146b connected to the connecting section 148.

The effect achieved by the identical offset of the guide elements 144a, 144b, firstly, and of the guide rail sections 152, 154, secondly, is that a horizontal orientation of the closing surface element 140 is always obtained irrespective of the position thereof within the guide rails 150. This applies at least to the guide devices 142 and the section 146a connected rigidly thereto. However, the pivoting section 146b can be deflected in relation to the rigid section 146a because of the elastic connecting section 148. As soon as a force 180, in particular originating from a loading flap, acts on the pivoting section 146b, the latter is deflected with simultaneous elastic deformation of the connecting section 148 such that it can be brought without damage into a position in which it does not stand in the way of closing of the loading flap.

The embodiments below are constructed in a similar manner. In particular the differences over the embodiment of FIGS. 2a and 2b are therefore explained below.

Figure 3A:
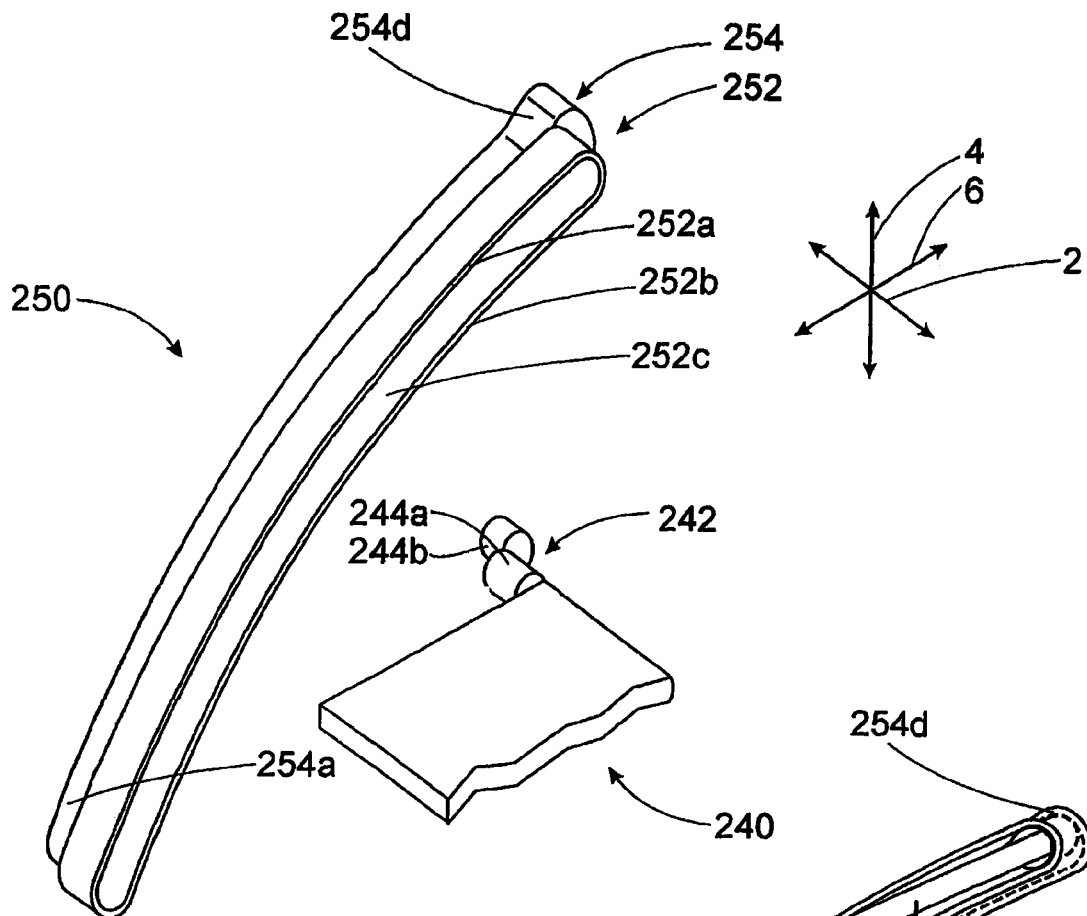
FIGS. 3a and 3b show a third embodiment of a covering system according to the invention.
Figure 3B:
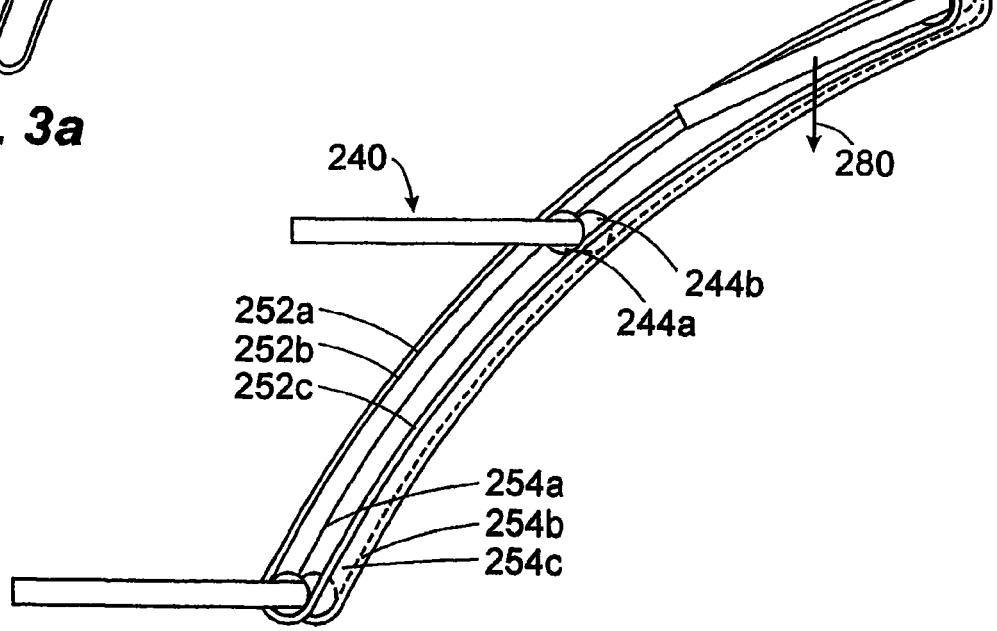

In the embodiment of FIGS. 3a and 3b, a guide rail 250 which has two guide rail sections 252, 254 is in turn provided. Said guide rail sections in turn each have two delimiting walls 252a, 252b, 254a, 254b which respectively delimit and define a guide track 252c, 254c. The guide tracks 252c, 254c are again designed such that they run parallel to each other over a large part. However, in an upper end region, the outer guide track 254c is widened by a bulge 254d in the upper guide wall 254a. The closing surface element 240 likewise largely corresponds to the closing surface element 140 of the embodiment of FIGS. 2a and 2b. However, in a departure from this first embodiment, it is a fully dimensionally stable design. Guide devices 242 which each comprise two guide bodies 244a, 244b which are connected rigidly to each other and to the closing surface element 240 are in turn provided on both sides of the closing surface element 240.

As in the embodiment of FIGS. 2a and 2b, in this embodiment too, the design of the guide tracks 252c, 254c, which are parallel to each other over large stretches, together with the corresponding design of the guide bodies 244a, 244b ensures that, during the movement out of its lower end position, the closing surface element 240 remains in a horizontal orientation. However, when the closing surface element 240 reaches the upper end position, the outer guide body 244b can slide into the bulge 254d. This takes place owing to the weight 280 of the closing surface element 240. As a result, in the upper end position, the guide bodies take up a position which deviates from each other in the vertical direction 4 of the vehicle, and therefore, in its upper end position, the closing surface element 240 takes up a pivoted position in which it is folded downward and does not stand in the way of closing of a loading flap.

The embodiment of FIGS. 4a and 4b largely corresponds to the embodiment of FIGS. 3a and 3b. However, in a departure therefrom, the two guide track sections 352, 354 of the guide track 350 have a corresponding profile over large sections. Only in the upper end region do the profiles differ from each other, since the outer guide rail section 354 again has a bulge 354d which, in the upper end position of the closing surface element 340, brings about a folding down of the closing surface element 340 because of its weight 380. One difference between the embodiment of FIGS. 3a and 3b, firstly, and the embodiment of FIGS. 4a and 4b, secondly, is that because of the profile of the inner and of the outer guide rail sections 354, 352 being identical over large sections, during the transfer into its upper end position the closing surface element 340 is first of all pivoted upward until it reaches the region in which the guide body 344b slides into the region of the bulge 354d.

The embodiment of FIGS. 5a and 5b is again constructed in a similar manner. The guide rail 450 again has two guide rail sections 452, 454. In this case, the guide track profiles, which are respectively defined by the guide rail sections 452, 454, differ merely in that, as in the embodiment of FIGS. 4a and 4b, the guide track profile of the outer guide rail section 454 is widened. However, this is not brought about by means of a rigid bulge in the wall 454a of the outer guide rail section 454 but rather by means of an elastically deflectable tab 454e which is fastened integrally to the rear guide rail section 454. Said elastically deflectable tab 454e is deflected by the outer guide body 444b as soon as a sufficiently large pivoting force 480 forces the closing surface element 440 downward. It is therefore ensured even in this embodiment that, during the closing of a loading flap, the closing surface element 440 can be deflected in the prescribed manner in order to avoid damage to the closing surface element 440 or to the rear space flap.

Figures 6A, 6B:
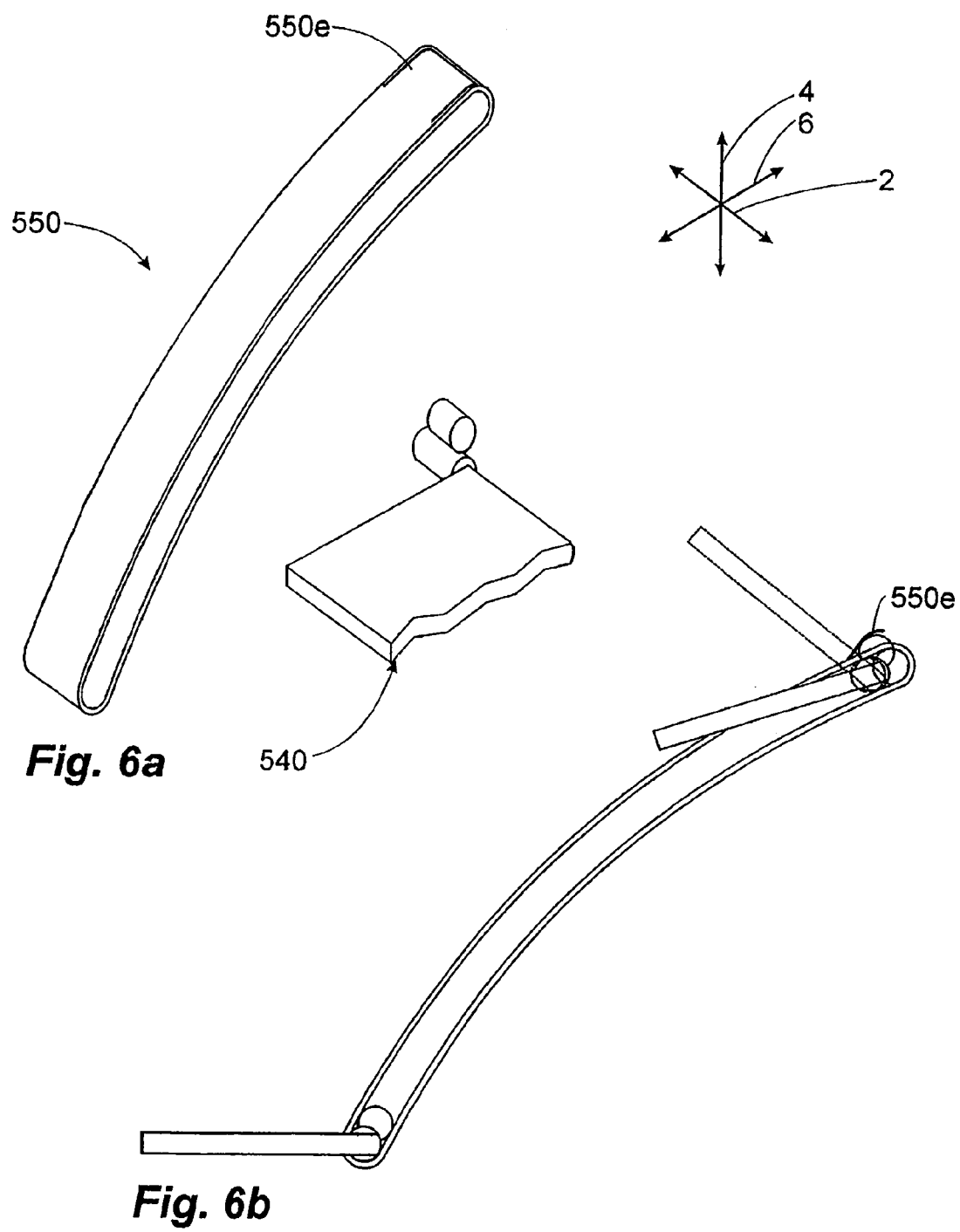
FIGS. 6a and 6b show a sixth embodiment of a covering system according to the invention.

The embodiment of FIG. 6a, 6b comprises a guide rail 550 which, differently from the guide rails of the previously described embodiments, is not of two-part design. In this rail, an elastically deflectable tab 550e which permits a deflection of the closing surface element 540 in a similar manner as in the embodiment of FIGS. 5a and 5b is provided in the upper end region.

The invention claimed is:

1. A vehicle with a rear storage space and a loading flap for closing the rear storage space, and a covering system provided in the rear storage space, the rear storage space being accessible via the loading flap, the covering system comprising two guide rails which run essentially parallel and are arranged on both sides of the rear storage space in a manner spaced-apart from each other in a transverse direction of the vehicle, and a largely dimensionally stable closing surface element having a guide device on each side thereof, the guide devices being arranged movably within the respective guide rails such that the closing surface element is movable along the guide rails between a lower end position and an upper end position, the closing surface element having a pivoting section pivotable downwardly when the closing surface element is in the upper end position to avoid interference of the closing surface element with the loading flap of the vehicle when in a closed position, the guide rails being disposed in the rear storage space of the vehicle closely adjacent the loading flap such that the closing surface element in the upper end position would project out of the rear storage space if oriented horizontally.

2. The vehicle and covering system according to claim 1, wherein in the upper end position, the pivoting section is pivoted downward by means of a dead weight of the pivoting section.

3. The vehicle and covering system according to claim 1, wherein the pivoting section is pivoted only in the upper end position.

4. The vehicle and covering system according to claim 1, wherein the guide rails and the guide devices are coordinated with each other in such a manner that the pivoting section is pivoted in the upper end position.

5. The vehicle and covering system of claim 1, wherein each guide device has a first guide body and a second guide body, and each guide rail has a first guide track for receiving the first guide body of one of the guide devices which is movable in the first guide track, and a second guide track for receiving the second guide body of the one guide device which is movable in the second guide track, wherein the second guide track is offset in relation to the first guide track in an offset direction corresponding to a longitudinal direction of the vehicle, and one of the first guide track and the second guide track having a section having a different profile than the other guide track with reference to a plane extending perpendicularly to the offset direction.

6. The vehicle and covering system according to claim 5, wherein the first and second guide tracks are disposed directly adjacent one another in the transverse direction of the vehicle, and are delimited by a common, integral guide rail component.

7. The vehicle and covering system according to claim 6, wherein one of the first and second guide tracks has a widened section at one end thereof.

8. A covering system for disposal within a rear storage space of a vehicle accessible via a loading flap of the vehicle which is movable into an open position to provide access to the rear storage space and into a closed position to close off the rear storage space, said covering system comprising:

first and second guide rails extending essentially parallel to one another on respective sides of the rear storage space in a spaced-apart manner from one another in a transverse direction of the vehicle; and a substantially dimensionally stable closing surface element having first and second guide devices disposed on respective opposite sides thereof, said first and second guide devices being respectively movably disposed within said first and second guide rails to permit said closing surface element to be movable along and relative to said first and second guide rails between a lower end position and an upper end position, said first and second guide devices and said first and second guide rails being cooperatively configured to maintain said closing surface element in a horizontal orientation as said closing surface element is moved from said lower end position towards said upper end position, said closing surface element pivoting downwardly and out of said horizontal orientation upon reaching said upper end position of said closing surface element to avoid interference of said closing surface element with the loading flap of the vehicle when in the closed position.

9. The covering system according to claim 8, wherein an upper end of each said first and second guide rail is configured to permit downward pivoting of said closing surface element in said upper end position due the weight of said closing surface element.

10. The covering system according to claim 8, wherein each said first and second guide rail includes first and second interconnected guide tracks which are offset from one another in a longitudinal direction of the vehicle, each said first and second guide device including first and second interconnected guide bodies which are offset from one another in a longitudinal direction of the vehicle, said first guide bodies being movably disposed in the respective said first guide rails and said second guide bodies being movably disposed in the respective said second guide rails.

11. The covering system according to claim 10, wherein said first guide rails are disposed sidewardly outwardly from the corresponding said second guide rails in the transverse direction of the vehicle, and each said first guide track at an upper end thereof is enlarged in a direction substantially perpendicular to the longitudinal direction of the vehicle such that when said first guide bodies reach said upper ends of said first guide rails, said closing surface element automatically pivots downwardly from said horizontal orientation.

* * * * *